US005660622A

United States Patent [19]

Nikoloff

[11] Patent Number: 5,660,622

[45] Date of Patent: Aug. 26, 1997

[54] COATING FOR INK JET RECORDING SHEETS

[76] Inventor: Koyu P. Nikoloff, 750 Stony La., North Kingstown, R.I. 02852

[21] Appl. No.: 694,068

[22] Filed: Aug. 8, 1996

[51] Int. Cl.[6] .................... G01D 15/16

[52] U.S. Cl. .................... 106/287.34; 106/491; 106/492; 162/135; 347/105; 428/211; 428/195

[58] Field of Search .................... 428/211, 195; 347/105; 162/135; 106/287.34, 491, 492

[56] References Cited

U.S. PATENT DOCUMENTS

| | | | |
|---|---|---|---|
| 4,371,582 | 2/1983 | Suglyama et al. | 428/341 |
| 4,554,181 | 11/1985 | Cousin et al. | 427/261 |
| 4,576,867 | 3/1986 | Miyamoto | 428/342 |
| 4,620,197 | 10/1986 | Miyamoto et al. | 347/105 |

*Primary Examiner*—Melissa Bonner
*Attorney, Agent, or Firm*—Barlow & Barlow, Ltd.

[57] ABSTRACT

A coating composition for ink jet recording sheets, which includes a combination of hydrated amorphous synthetic silica, a synthetic binder, a cationic agent, a leveling-flow modifier, a dispersing agent, an optical brightener, and the remainder being water, is provided. The composition achieves superior brilliance, water fastness, water resistance and improved controlled absorbency of the ink with improved color density.

23 Claims, No Drawings

COATING FOR INK JET RECORDING SHEETS

BACKGROUND OF THE INVENTION

The present invention relates generally to coatings for application to recording sheets. More specifically, the present invention relates to an improved coating for ink jet recording sheets.

In the field of printing, particularly ink jet printing, it has been well-known to employ one or more ink jet assemblies connected to a source of ink. Each ink jet is electromagnetically energized to emit uniform droplets of ink as a continuous stream or as individual droplets. The droplets are directed onto the surface of a moving web and controlled to form printed characters. In view of this technique, the quality of printing, using the ink jet recording process, is highly dependent on jet operation and the properties of the ink and particularly the surface characteristics of the recording paper and the type of coatings applied thereon. The ink must be capable of forming stable ink droplets under pressure and must readily emerge from the ink jet. Aqueous inks containing a water soluble dye and a humectant, to prevent ink from drying out in the jet assembly, have been found to be desirable. However, the absorption of these inks by the recording sheet has been problematic, particularly in the area of multi-color printing where two or more ink drops may overlap on the surface of the recording sheet.

To ensure good image quality, the recording sheet must absorb the ink rapidly and at the same time insolubilize the ink dye on the sheet surface. Good absorption reduces the ability of the ink to transfer to sheet handling rollers and other printer machine parts while insolubility of the ink dye ensures high optical density. Unfortunately, papers with high absorbency draw the ink deeply into the paper which sacrifices optical density. Moreover, such recording sheets suffer from feathering and poor acuity. In addition, high quality papers with low absorbency suffer from set-off because the ink is not absorbed rapidly and smearing often occurs.

Due to the advent of high quality, low cost color ink jet printers and advancements in commercial papermaking, there is a demand for high color density and clear color tone resolutions. Paper for recording sheets used in such ink jet printing must rapidly absorb the ink and must be free from the flow-out of ink and from the danger of staining even if the paper is touched just after printing. Further, the diffusion of ink laterally on the recording sheet must be prevented in order to achieve high resolution without blurring. Thus, for obtaining color images, having good color density and resolution with good absorbing property and water fastness as well as optical brightness, a coated paper for ink jet recording must satisfy all of these requirements.

Various attempts have been made in the prior art to achieve a quality ink jet recording sheet which has each of these desired features. For example, U.S. Pat. No. 4,371,582, issued to Sugiyama et al. and incorporated herein by reference, discloses a recording sheet containing insoluble latex polymer which is designed to be used in ink jet recording with water soluble dyes to improve water fastness. The insoluble basic latex polymer is applied to the surface of the recording creating an impervious film that provides no absorbency for the water-soluble dyes. The Sugiyama patent suffers from offsetting for having applied water insoluble latex onto a highly water resistant paper creating an unpenetrable surface where the ink does not dry and smears. Also, this coating needs a cationic donor for water resistance.

In addition, U.S. Pat. No. 4,554,181, issued to Cousin et al. and incorporated herein by reference, discloses an ink jet recording sheet having a bicomponent cationic recording surface where a water soluble polyvalent metal salt is provided. The use of such a conductive resin serves as a humectant suffers from bad water resistance and is, therefore, subject to smearing.

Further, U.S. Pat. No. 4,576,867, issued to Miyamoto and incorporated herein by reference, discloses ink jet recording paper with a cationic resin attached to at least the surface thereof. Due to the lack of leveling and flow modifiers and dispersing agents, blotching and poor wettability will occur.

Conventional natural binders and cationic resins such as polyethylenimine, metal salts, or dicyandiamide formaldehyde condensate (carcinogenic) plyamines have not been sufficient to provide all the desired properties. When using natural water soluble binders and water soluble cationic resins, poor water resistance and inferior water fastness will result. Such cationic donors attach to the surface of the ink jet recording paper sheet and, as a result, facilitate smearing.

Therefore, a coating which allows ink jet printing with superior water resistance, water fastness, controlled wettability, and adjustable brightness is desired to address those needs not found in the prior art.

SUMMARY OF THE INVENTION

The present invention preserves the advantages of prior art coatings for ink jet recording sheets. In addition, it provides new advantages not found in currently available coatings and overcomes many disadvantages of such coatings.

The invention is generally directed to a novel and unique coating for recording media with particular application in providing a coating for ink jet recording sheets. The ink jet recording sheet coating of the present invention, unlike other commercial types of surface treatments for ink jet, provides a single package composition coating. The present invention provides high color-density resolution, excellent brilliance, water and smear resistance as well as good flow distribution of the ink while the ink is maintained on the surface of the ink jet recording sheet. Each time the coating of the present invention is used, there is no variation in the paper treated surface. Moreover, the color density of the printed ink jet sheet is greatly improved. It is the only coating that offers a flexibility to the manufacturer of ink jet recording paper to make several grades by varying the amount of coating applied.

The coating composition for an ink jet recording sheet of the present invention, includes, by weight percent:

5–35% hydrated amorphous synthetic silica;

5–20% synthetic binder;

0.5–10% cationic agent;

0.5–3% leveling-flow modifier;

0.5–3% dispersing agent;

0.2–2% optical brightener; and the remainder being $H_2O$.

In addition, the coating of the present invention may also optionally include 0–20% of $TiO_2$ (titanium dioxide) pigment and/or 0–2% of a viscosity modifier to further adjust the characteristics of the coating in accordance with a particular desired application. The viscosity modifier may be alginates, CMC (carboxyl methyl cellulose), HMC (hydroxyl methyl cellulose) or polyacrylates.

The combination of the foregoing component allows an ink jet recording sheet coated with the coating of the present invention to provide high color-density resolution, superior brilliance, excellent water and smear resistance as well as good flow distribution in addition to water fastness.

It is therefore an object of the present invention to provide a coating for ink jet recording sheets which achieves superior color brilliance.

Another object of the present invention is to provide an improved coating for ink jet recording sheets which achieves superior water and smear resistance.

A further object of the present invention is to provide a single package coating to eliminate the variability of the ink jet recording paper.

It is a further object of the present invention to provide an improved coating for ink jet recording sheets which achieves excellent flow distribution of the ink while the ink is maintained on the surface of the recording sheet.

It is yet a further object of the present invention to provide an improved coating for ink jet recording sheets which achieves superior water fastness.

It is another object of the present invention to provide an improved coating for ink jet recording sheets which can be easily adjusted to accommodate various coating equipment.

It is yet a further object of the present invention to provide an improved coating for ink jet recording sheets which achieves controlled absorbency without sacrificing briliance.

DETAILED DESCRIPTION OF THE PREFERRED EMBODIMENT

The present invention, incorporated into a single package composition coating, incorporates specific chemical components to meet the aforementioned highly desirable characteristics for ink jet printing. The coating of the present invention is fully cationized with a special charged density which provides uniformity and, therefore, eliminates the need for attaching cationic resins to the paper surface.

In this connection, a synthetic silicone dioxide is provided as a component of the inventive coating in the form of hydrated amorphous synthetic silica which can be made by precisely mixing acid with sodium silicate. The hydrated amorphous synthetic silica is preferably in the weigh percent range of 5–35% of the coating composition. The hydrated amorphous synthetic silica preferably has a pore volume of 0.8–2.0 ml/g with an average particle size of 4.3–11.5 microns, as determined by a Malvern Mastersizer (100 mm lens). The amorphous rather than crystalline structure of this component is selected for the proper pore volume in order to absorb the liquid ink yet maintain it on the surface in similar fashion to very small shallow wells filled yet kept on the surface. This hydrated amorphous synthetic silica provides the desired particle size and pore volume for proper ink distribution. As a result, the degree of absorbency of the ink into the recording sheet can be precisely controlled. Thus, absorbency can be achieved without sacrificing brilliance.

In addition, a synthetic binder, preferably in the weight percent range of 5–20%, is provided in the coating composition of the present invention. This water dispersible synthetic binder may be acrylic prepolymer or PVA alone. This synthetic binder improves overall coating performance by providing faster drying and eliminating smearing. Overall water resistance is consequently improved.

A cationic agent in the weight percent range of 0.5–10%, is provided in the present invention. This cationic agent is preferably a dispersible poly-dmdacs (poly dimethyldiallylammonium chloride) in conjunction with a cationic copolymer acrylamide having the following chemical formula:

POLY DMDACS

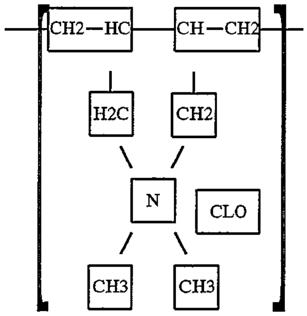

COPOLYMER CATIONIC ACRYLAMIDE

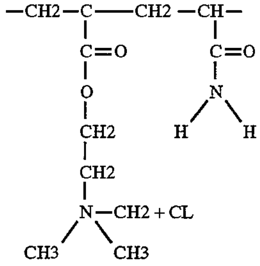

These poly-dmdacs and cationic copolymer acrylamides as the cationic agents rapidly insolubilize the anionic dyes thus greatly improving the water and smear resistance of the ink jet recording sheet which has been printed upon.

Additionally, a leveling and flow modifier is provided in the weight percent range of 0.5–3% of the composition of the present invention. Such modifiers for leveling of flow may be glycerine or other poly-hydrates to lubricate the composition to improve flow and smoothing as well as to prevent blotching.

A dispersing agent is preferably provided in the range of 0.5–3% in the composition of the present invention. The dispersing agent assists in dispersing the silica and pigment throughout the mixture and enhances the overall wettability of pigment. The preferred material for the dispersing agent is sodium hexamethaphosphate.

Additionally, the preferred embodiment of the composition of the present invention also includes an optical brightener, preferably in the weight percent range of 0.2–2%, within the composition. The preferred material for the optical brightener includes a Stilbene yellow base. This optical brightener enables customized adjustment of the florescent brightness in the paper in accordance with the desired application. Optical brightener can be effectively used and improves brightness by 4–5 points and titanium dioxide may be used as an extender. As a result, the cationic charge density will vary but will remain with acceptable range limits.

In addition to the foregoing components, the remainder of the composition is water ($H_2O$). In general, the solid composition of the ink jet coating may be in the range of 10–50% solids.

In addition to the foregoing basic composition, titanium dioxide ($TiO_2$) pigment may be included in the composition of the present invention to adjust opacity of the recording sheet paper. Such opacity can be easily controlled and adjusted by the manufacturer by varying the mount of titanium dioxide pigment in accordance with the desired application. This titanium dioxide pigment may be provided in the range of 0–20%, by weight percent, of the composition of the present invention. Further, 0–2%, by weight percent, of a viscosity modifier may be added to the composition to adjust the consistency of the coating to match the equipment of a wide array of paper mills. As a result, the coating of the present invention can be prepared to a predetermined viscosity to accommodate a wide array of coating equipment available, such as roll coaters, sort dwell equipment, blades, air knives, size presses, calendar stacks, Gravure print rolls, and other known equipment.

In the alternative to the foregoing weight percent amounts of each component, to accommodate a variety of different applications, the coating composition of the present invention may be, in weight percent, as follows:

5–35% hydrated amorphous synthetic silica;

0.1–15% $TiO_2$ pigment;

5–20% synthetic binder;

1–10% cationic agent;

0.5–1.5% leveling-flow modifier;

0.5–3% dispersing agent;

0.1–2% viscosity modifier;

0.2–1.5% optical brightener; and the remainder being $H_2O$.

The tests conducted and results described below were used to compare and evaluate various test sheets with and without the coating composition of the present invention. The test results below highlight the optical benefits which can be achieved in color densities (Table 1), water fastness (Table 2) and offsetting (Table 3). Each of the tests were conducted by printing the standard color test pattern output on a Hewlett Packard 1200C color desk jet printer. The "Applicant's Coating—Invention" represents commercial xerographic paper coated with the coating composition of the present invention. Each component of Applicant's Coating in Tables 1, 2, and 3 are within the respective weight percent ranges disclosed above in connection with Applicant's inventive composition.

TABLE 1

Optical Ink Density

| | Black | Yellow | Magenta | Blue |
|---|---|---|---|---|
| Uncoated Base Paper | 1.01 | 0.96 | 0.98 | 1.03 |
| Commercial Jet Paper | 1.29 | 1.19 | 1.11 | 1.29 |
| Applicant's Coating - Invention | 1.59 | 1.58 | 1.49 | 1.69 |
| Applicant's Coating - Invention | 1.59 | 1.56 | 1.51 | 1.68 |
| Commercial Jet Paper | 1.29 | 1.14 | 1.08 | 1.27 |

TABLE 2

Water Fastness (Loss in Optical Density, One Min. Soak)

| | Black | Yellow | Magenta | Blue |
|---|---|---|---|---|
| Commercial Jet Paper | 0.43 | 0.41 | 0.49 | 0.45 |
| Applicant's Coating - Invention | 0.2 | 0.0 | 0.1 | 0.0 |
| Applicant's Coating - Invention | 0.1 | 0.0 | 0.0 | 0.0 |
| Commercial Jet Paper | 0.47 | 0.44 | 0.47 | 0.42 |
| Uncoated Base Paper | 0.89 | 0.87 | 0.94 | 0.96 |

TABLE 3

Offsetting (Smear) (Seconds to No Ink Set Off)

| | Black | Yellow | Magenta | Blue |
|---|---|---|---|---|
| Commercial Jet Paper 8 | 6 | 11 | 9 | 10 |
| Applicant's Coating - Invention | 2 | 1 | 1 | 2 |
| Applicant's Coating - Invention | 1 | 0 | 1 | 1 |
| Commercial Jet Paper 9 | 8 | 13 | 10 | 14 |
| Uncoated Base Paper | 14 | 12 | 16 | 18 |

As can be seen from the testing results, the coating composition of the present invention used alone on commercial uncoated xerographic paper achieves superior optical ink densities, brilliant colors and superior water resistance and water fastness and can accommodate a wide variety of ink types and colors. The balance of the water insoluble binder controls the absorption of the ink in the pore volume of the amorphous silica that provides the brilliance of the printed paper coated with the coating of the present invention.

While the components of the present invention are described, other similar materials for the components may be employed without departing from the scope of the invention. In addition, the coating composition of the present invention may be used as an additive to other ink jet coatings to enhance their properties accordingly.

It would be appreciated by those skilled in the art that various changes and modifications can be made to the illustrated embodiments without departing from the spirit of the present invention. All such modifications and changes are intended to be covered by the appended claims.

What is claimed is:

1. A coating composition for an ink jet recording sheet, comprising by weight percent:

5–35% hydrated amorphous synthetic silica;

5–20% synthetic binder;

0.5–10% cationic agent;

0.5–3% leveling-flow modifier;

0.5–3% dispersing agent;

0.2–2% optical brightener; and the remainder being $H_2O$.

2. The coating of claim 1, further comprising: 0–20% $TiO_2$ pigment.

3. The coating of claim 1, further comprising:

0–2% viscosity modifier.

4. The coating of claim 1, wherein said hydrated amorphous synthetic silica is a mixture of acid and sodium silicate.

5. The coating of claim 1, wherein said hydrated amorphous synthetic silica has an average pore volume of 0.8–2.0 ml/g.

6. The coating of claim 1, wherein said hydrated amorphous synthetic silica has an average particle size range of4.3–11.5 microns.

7. The coating of claim 1, wherein said synthetic binder is a mixture of acrylic prepolymer and polyvinyl alcohol.

8. The coating of claim 1, wherein said cationic agent is poly dimethyldiallyammonium chloride and cationic copolymer acrylamide having the following general formulas:

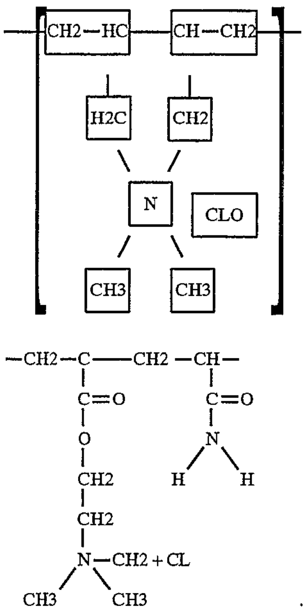

9. The coating of claim 1, wherein said leveling-flow modifier is glycerine.

10. The coating of claim 1, wherein said optical brightener has a Stilbene yellow base.

11. The coating of claim 1, wherein said dispersing agent is sodium hexamethaphosphate.

12. The coating of claim 3, wherein said viscosity modifier is a material selected from the group consisting of: alginates, carboxyl methyl cellulose, hydroxyl methyl cellulose and polyacrylates.

13. A coating composition for an ink jet recording sheet, comprising by weight percent:

5–35% hydrated amorphous synthetic silica;

0.1–15% $TiO_2$ pigment;

5–20% synthetic binder;

1–10% cationic agent;

0.5–1.5% leveling-flow modifier;

0.5–3% dispersing agent;

0.1–2% viscosity modifier;

0.2–1.5% optical brightener; and the remainder being $H_2O$.

14. The coating of claim 13, wherein said coating composition comprises 10–50% solids.

15. The coating of claim 13, wherein said hydrated amorphous synthetic silica is a mixture of acid and sodium silicate.

16. The coating of claim 13, wherein said hydrated amorphous synthetic silica has an average pore volume of 0.8–2.0 ml/g.

17. The coating of claim 13, wherein said hydrated amorphous synthetic silica has an average particle size range of 4.3–11.5 microns.

18. The coating of claim 13, wherein said synthetic binder is a mixture of acrylic prepolymer and polyvinyl alcohol.

19. The coating of claim 13, wherein said cationic agent is poly dimethyldiallyammonium chloride and cationic copolymer acrylamide having the following general formulas:

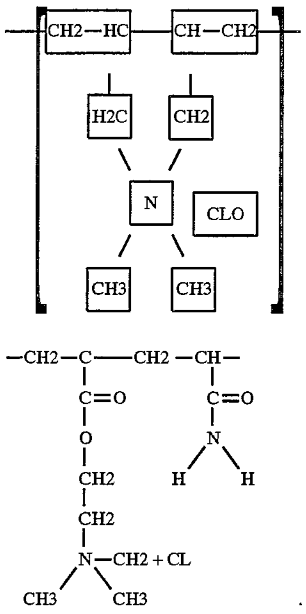

20. The coating of claim 13, wherein said leveling-flow modifier is glycerine.

21. The coating of claim 13, wherein said optical brightener has a Stilbene yellow base.

22. The coating of claim 13, wherein said dispersing agent is sodium hexamethaphosphate.

23. The coating of claim 13, wherein said viscosity modifier is a material selected from the group consisting of: alginates, carboxyl methyl cellulose, hydroxyl methyl cellulose and polyacrylates.

* * * * *